United States Patent

Sarangapani et al.

Patent Number: 6,092,016
Date of Patent: Jul. 18, 2000

[54] APPARATUS AND METHOD FOR DIAGNOSING AN ENGINE USING AN EXHAUST TEMPERATURE MODEL

[75] Inventors: Jagannathan Sarangapani, Peoria; David R. Schricker, Dunlap, both of Ill.

[73] Assignee: Caterpillar, Inc., Peoria, Ill.

[21] Appl. No.: 09/237,163

[22] Filed: Jan. 25, 1999

[51] Int. Cl.[7] .......................... F02D 41/14; F02D 41/22; G06G 7/70

[52] U.S. Cl. .................... 701/102; 701/114; 123/676; 73/117.3

[58] Field of Search .................. 123/435, 676; 701/102, 112, 114, 115, 100; 73/117.3

[56] References Cited

U.S. PATENT DOCUMENTS

| | | | |
|---|---|---|---|
| 4,875,451 | 10/1989 | Evasick et al. | 123/435 |
| 4,986,232 | 1/1991 | Richter et al. | 123/676 |
| 5,041,980 | 8/1991 | Maddock et al. | 701/101 |
| 5,107,432 | 4/1992 | Martinelli | 123/676 |
| 5,377,112 | 12/1994 | Brown, Jr. et al. | 701/115 |
| 5,526,266 | 6/1996 | Rutan et al. | 701/100 |
| 5,544,639 | 8/1996 | Shoulda et al. | 123/676 |
| 5,566,091 | 10/1996 | Schricker et al. | 702/34 |
| 5,585,553 | 12/1996 | Schricker | 73/117.3 |
| 5,848,372 | 12/1998 | Ito et al. | 701/102 |
| 5,964,811 | 10/1999 | Ishii et al. | 701/102 |
| 5,983,876 | 11/1999 | Irons et al. | 123/676 |

*Primary Examiner*—Willis R. Wolfe
*Attorney, Agent, or Firm*—Haverstock Garrett & Roberts

[57] ABSTRACT

An apparatus and method for diagnosing an engine including at least two cylinder banks using an exhaust temperature model is disclosed. The apparatus and method are operable for: (a) determining an actual exhaust temperature value for the first cylinder bank, an actual exhaust temperature value for the second cylinder bank, and an average exhaust temperature value for the first and second cylinder banks; (b) determining a plurality of parameters; (c) determining a modeled exhaust temperature value for the first cylinder bank, a modeled exhaust temperature value for the second cylinder bank, and a modeled average exhaust temperature value for the first and second cylinder banks, as a function of the plurality of parameters; (d) comparing the modeled and actual exhaust temperature values for the first cylinder bank, comparing the modeled and actual exhaust temperature values for the second cylinder bank, and comparing the modeled and actual average temperature values, and responsively determining a difference value for the first cylinder bank, a difference value for the second cylinder bank, and an average difference value, respectively; and (e) diagnosing the engine as a function of at least one of the difference value for the first cylinder bank, the difference value for the second cylinder bank, and the average difference value.

10 Claims, 4 Drawing Sheets

APPARATUS AND METHOD FOR DIAGNOSING AN ENGINE USING AN EXHAUST TEMPERATURE MODEL

TECHNICAL FIELD

This invention relates generally to an apparatus and method for providing engine diagnostics, and more particularly, to an apparatus and method for diagnosing an engine using a computer based model of exhaust temperature.

BACKGROUND ART

Proper maintenance of a vehicle's engine is an important priority in the daily operation of a vehicle. Without proper maintenance minor problems can escalate into major mechanical failures, resulting in costly downtime and expensive repairs.

Typically, when an operator observes a performance loss of power in a vehicle's engine, the vehicle is brought into the shop for testing and repair.

Unfortunately, the best time to diagnose power-related problems is during the typical driving conditions. In the shop, test data may be collected using a dynamometer. However, this data is really only useful for verifying that a power problem exists. It does not necessarily locate the problem.

Therefore, the best way to diagnose the engine is by collecting data during operation and analyzing the data. Generally, this type of analysis has been confined to collecting the data and comparing the data to standard or normal graphs. The problem with this type of method is that it does not provide on-board or real-time diagnostics. It also requires that an operator recognize a loss of power and that the vehicle is brought in for maintenance. Furthermore, it requires a great amount of skill and knowledge to equate deviations in the engine parameters to a type of problem or the location of the problem.

It is also known to use computer-based models for diagnosing an engine. Reference for instance, Brown, Jr. et al. U.S. Pat. No. 5,377,112 issued Dec. 27, 1994 and Rutan et al. U.S. Pat. No. 5,526,266 issued Jun. 11, 1996, both to Caterpillar Inc.

However, diagnosing a combustion related problem in an individual cylinder or bank of cylinders of an engine has been found to be difficult when using the known models.

Accordingly, the present invention is directed to overcoming one or more of the problems as set forth above.

DISCLOSURE OF THE INVENTION

In one aspect of the present invention, a method for diagnosing an engine including at least two cylinder banks is provided. The method includes the steps of:

(a) determining an actual exhaust temperature value for the first cylinder bank, and actual exhaust temperature value for the second cylinder bank, and an average exhaust temperature value for the first and second cylinder banks;

(b) determining a plurality of parameters;

(c) determining a modeled exhaust temperature value for the first cylinder bank, a modeled exhaust temperature value for the second cylinder bank, and a modeled average exhaust temperature value for the first and second temperature banks, as a function of the plurality of parameters;

(d) comparing the modeled and actual exhaust temperature values for the first cylinder bank, comparing the modeled and actual exhaust temperature values for the second cylinder bank, and comparing the modeled and actual average temperature values, and responsively determining a difference value for the first cylinder bank, a difference value for the second cylinder bank, and an average difference value, respectively; and (e) diagnosing the engine as a function of at least one of the difference value for the first cylinder bank, the difference value for the second cylinder bank, and the average difference value.

In another aspect of the invention, apparatus for diagnosing an engine including at least two cylinder banks is provided. The apparatus includes means for determining an actual exhaust temperature value for the first cylinder bank, an actual exhaust temperature value for the second cylinder bank, and an average exhaust temperature value for the first and second cylinder banks; means for determining a plurality of parameters; and means for determining a modeled exhaust temperature value for the first cylinder bank, a modeled exhaust temperature value for the second cylinder bank, and a modeled average exhaust temperature value for the first and second temperature banks, as a function of the plurality of parameters. The apparatus includes means for comparing the modeled and actual exhaust temperature values for the first cylinder bank, comparing the modeled and actual exhaust temperature values for the second cylinder bank, and for comparing the modeled and actual average temperature values, and responsively determining a difference value for the first cylinder bank, a difference value for the second cylinder bank, and an average difference value, respectively. Additionally, the apparatus includes means for diagnosing the engine as a function of at least one of the difference value for the first cylinder bank, the difference value for the second cylinder bank, and the average difference value.

BEST MODE FOR CARRYING OUT THE INVENTION

Figure 1:
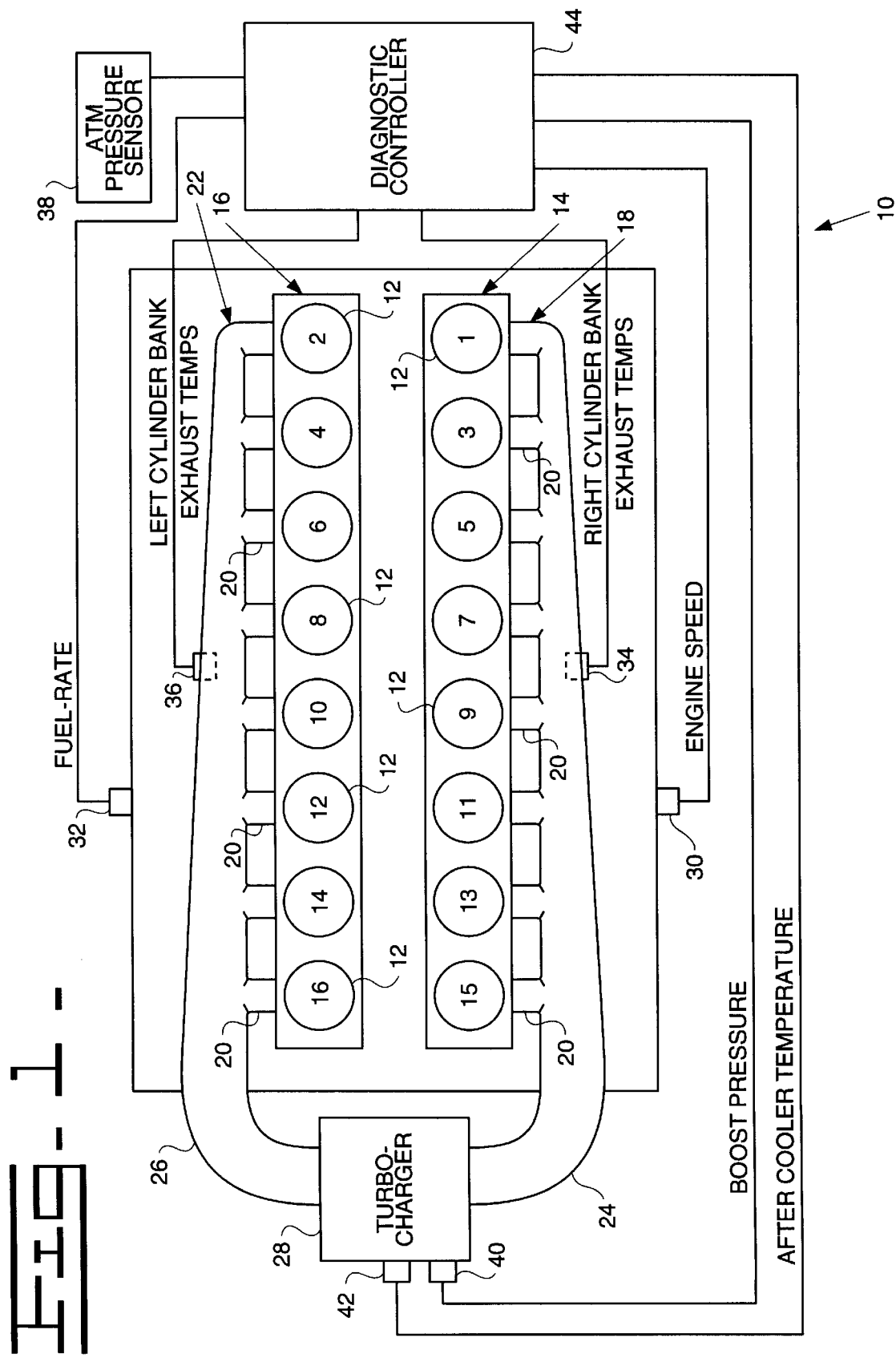
FIG. 1 is a schematic representation of an engine and apparatus according to the present invention for diagnosing the engine using an exhaust temperature model.

With reference to FIG. 1, the present invention is adapted to model exhaust temperature of an engine 10. Engine 10 is a conventionally constructed and operable reciprocating internal combustion engine having sixteen cylinders 12 each including a piston reciprocally operable therein for combusting a mixture of air and fuel in the conventional manner. The cylinders 12 are contained in first and second cylinder banks, identified as a right cylinder bank 14 and a left cylinder bank 16. A right exhaust manifold 18 is connected to right cylinder bank 14 and includes a plurality of individual exhaust runners 20 communicating respectively with cylinders 12 of right cylinder bank 14 for receiving exhaust products exhausted therefrom. Similarly, a left exhaust manifold 22 is connected to left cylinder bank 16 and includes a plurality of individual exhaust runners 20 connected respectively to cylinders 12 of left cylinder bank 16 for receiving exhaust products exhausted therefrom. The exhaust runners 20 of right exhaust manifold 18 are connected to a right exhaust conduit 24 and the runners 20 of left exhaust manifold 22 connect to a left exhaust conduit 26, exhaust conduits 24 and 26 terminating at a conventionally constructed and operable turbocharger 28 for delivering the exhaust from cylinders 12 thereto.

Engine 10 includes a plurality of sensors for sensing various parameters thereof, including, but not limited to, an engine speed sensor 30, a fuel-rate sensor 32, a right cylinder bank exhaust temperature sensor 34 and a left cylinder bank exhaust temperature sensor 36. An atmospheric pressure sensor 38 is also present, and turbo charger 28 includes a boost pressure sensor 40 and an after cooler temperature sensor 42.

A diagnostic controller 44 constructed and operable according to the teachings of the present invention is operably connected to sensors 30–42, either directly or indirectly through an engine control module or other device (not shown) for receiving signals from the sensors. Diagnostic controller 44 includes a processor, such as a microprocessor, (not shown) operable according to the invention for receiving sensor information from sensors 30–42, generating a computerized model of exhaust temperature of engine 10 and diagnosing engine 10 using the model, as will be explained next. Diagnostic controller 44 is preferably connected in association with engine 10 so as to be operable to provide real-time diagnosis thereof, but can alternatively be located at a remote location and connected to sensors 30–42 via a suitable conventional data link for real-time or later diagnosis.

Figure 2:
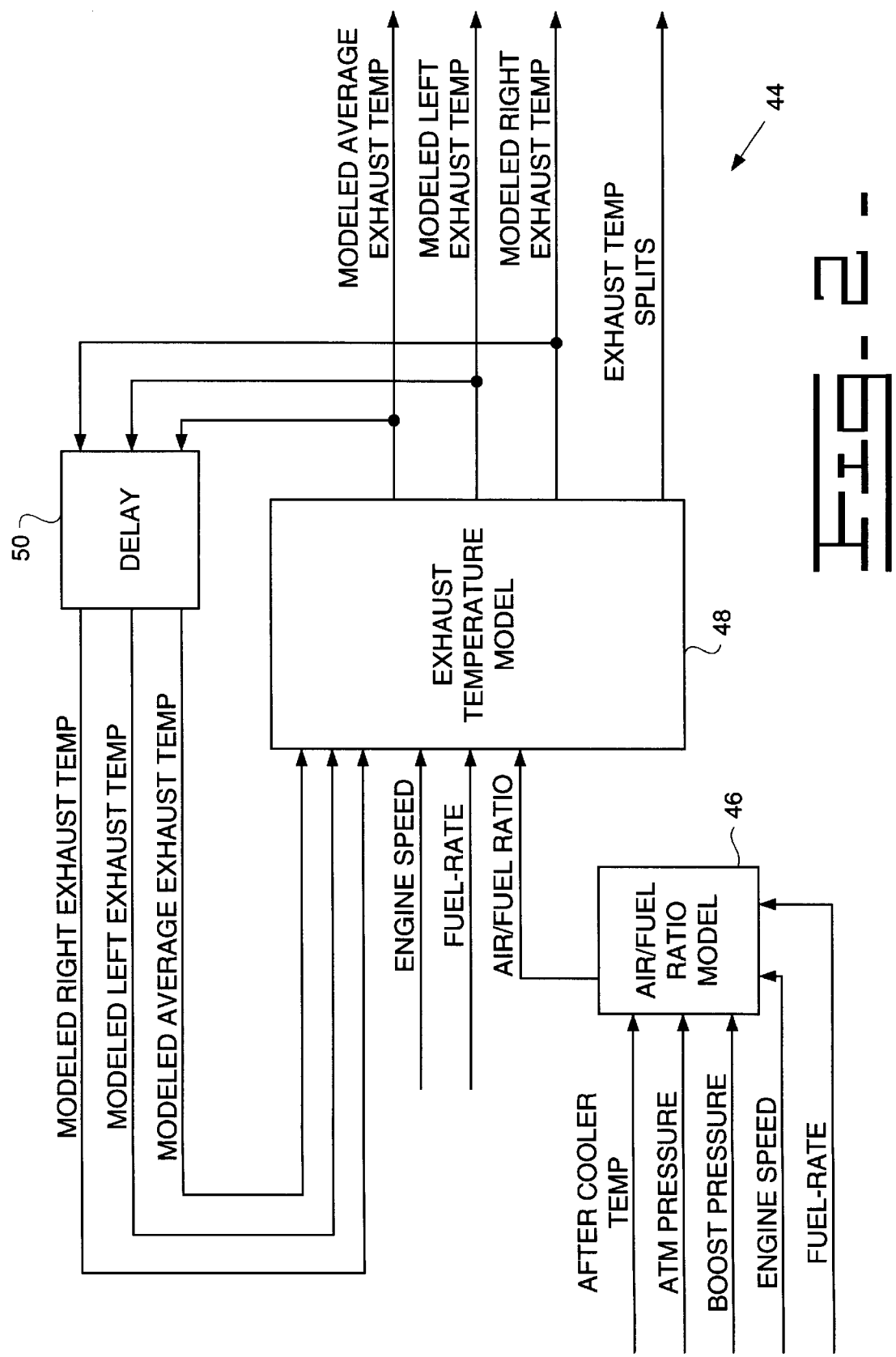
FIG. 2 is a diagrammatic representation of the present invention.

With reference to FIG. 2, the operation of diagnostic controller 44 may be more easily understood by looking at the flow of information. First, sensor information is received by diagnostic controller 44 and used in an air/fuel ratio model 46 to determine a modeled or predicted value of the air/fuel ratio for engine 10. Sensor information used includes, but is not limited to, after cooler temperature, atmospheric pressure, boost pressure, engine speed and fuel-rate. The modeled air/fuel ratio and other sensor information, namely, engine speed and fuel-rate information as well as previously modeled exhaust temperature information, is fed into an exhaust temperature model 48. Exhaust temperature model 48 generates a modeled or predicted right exhaust temperature, a modeled or predicted left exhaust temperature, and a modeled or predicted average exhaust temperature, which are then used to diagnose engine 10. Additionally, the modeled exhaust temperatures are collected, as shown at block 50 for use in subsequent modeling operations.

The preferred exhaust temperature model is a regression-based model. The preferred exhaust temperature polynomial function is:

$$\text{Exhaust Temp} = a_0 + a_1 x_1 + a_2 x_2 + a_3 x_2 x_3 x_4 + a_4 x_3 x_4$$

Where $a_0$–$a_4$ are polynomial constants, $x_1$ is previous exhaust temperature $x_2$ is boost pressure, $x_3$ is engine speed, and $x_4$ is fuel-rate.

The polynomial constants are derived using test data. Test data must be measured during operation which fairly represents the environmental and application requirements of the engine for which the constants are derived. Alternatively, the test data may consist of exhaust temperatures derived from a simulation of the engine.

Using the exhaust temperature polynomial function, the modeled left exhaust temperature value $T_{LM}$, the modeled right exhaust temperature value $T_{RM}$, and the modeled average exhaust temperature value $T_{AM}$ are determined. The modeled values can then be compared to the actual or measured temperature values, $T_L$ for the left temperature, $T_R$ for the right temperature, and $T_A$ for the average temperature, to diagnose the engine.

In one application of the present invention, a left difference value ($D_L = T_{LM} - T_L$) is determined by taking the difference between the modeled and actual exhaust temperatures of the left bank. Similarly, a right difference value ($D_R = T_{RM} - T_R$) is determined by taking the difference between the modeled and actual exhaust temperatures of the right bank. Degradation of a fuel injector is determined whenever high or low limits for either the left difference value, the right difference value, or both, are exceeded.

As another example, degradation of a fuel injector is determined by computing an exhaust temperature split value, i.e., $T_{SPLIT} = T_L - T_R$. Should one fuel injector fail to deliver fuel, the exhaust temperature of the associated engine bank will be cooler than the exhaust temperature measured for the other bank. Accordingly, by computing the temperature split, and setting both high and low limits on its value, diagnosis of fuel-delivery related problems can be made.

As yet another example, a determination of an engine-related problem is accomplished by comparing the modeled and actual average exhaust temperature values, $T_{AM}$ and $T_A$, respectively, and determining an average difference value ($D_A = T_{AM} - T_A$). The average difference value ($D_A$) will diagnose an engine problem whenever high or low limits for both the left difference value ($D_L$) and the right difference value ($D_R$) are exceeded, indicating a fault of both right and left cylinder banks (Note: the exhaust temperature split ($T_{SPLIT}$) under these conditions would remain at a value near zero, and thus not indicate that a problem exists). As an example, under normal conditions, the exhaust temperature split ($T_{SPLIT}$) would be a value near zero, indicating that all of the cylinders are firing properly, with little or no blockage. However, if both the left difference value ($D_L$) and the right difference value ($D_R$) increase or decrease, the average difference value ($D_A$) will correspondingly increase or decrease as well.

The exhaust temperature model of the present invention is designed to receive a plurality of parameters associated with the operation of the engine and, through the use of modeling techniques, diagnose an engine-related problem as a function of at least one of the difference between the modeled and actual values of the exhaust temperature of the left bank, the difference between the modeled and actual values of the exhaust temperature of the right bank, and the difference between the modeled and actual values of the average exhaust temperature values, exceeding a high or low limit. Furthermore, the difference values may be trended in order to predict when future failures will occur.

Figure 3:
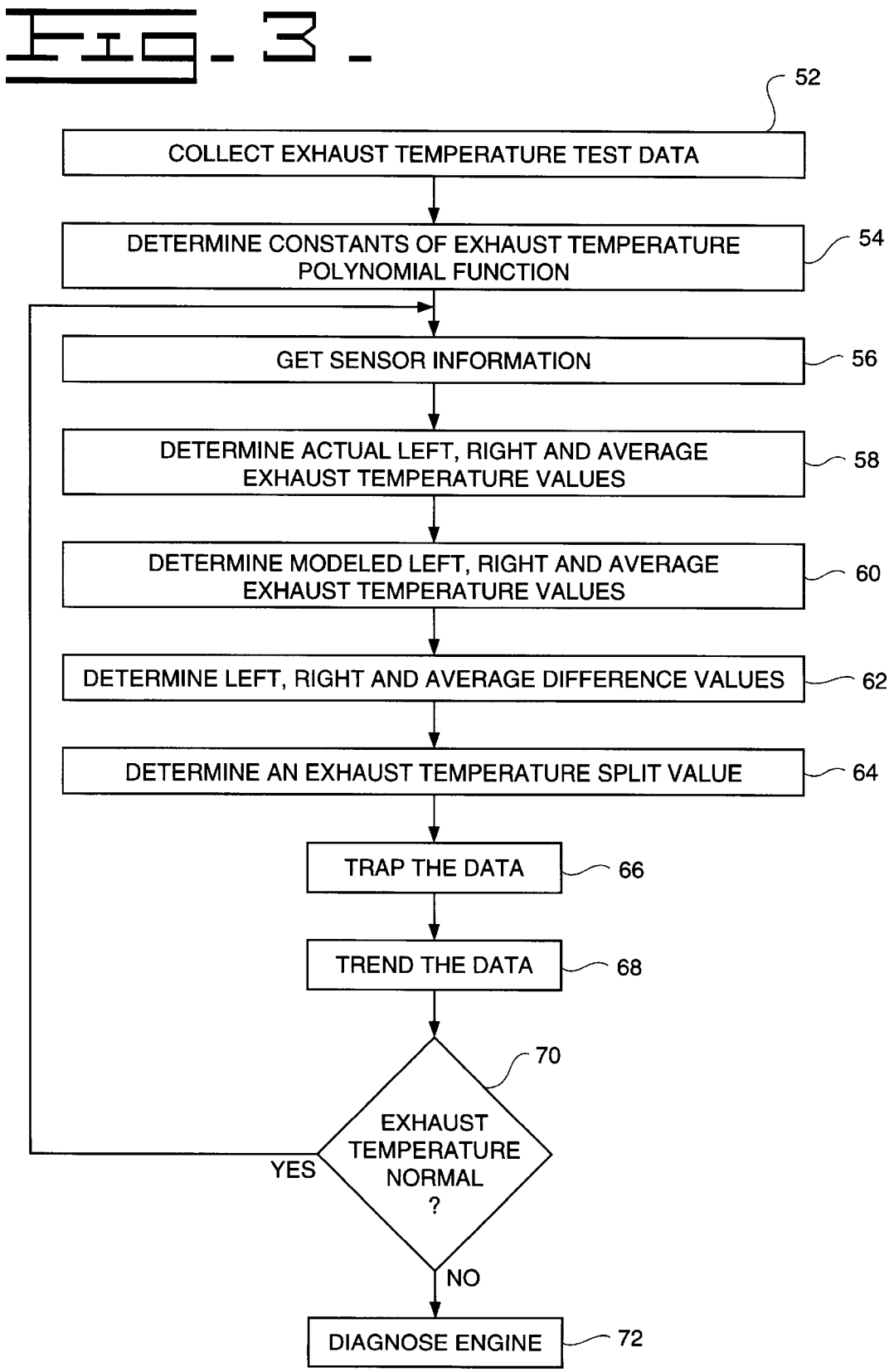
FIG. 3 is a high level flow chart illustrating a method according to the invention.

Turning to FIG. 3, a flow chart showing steps of the method according to the invention are shown. At block 52, exhaust temperature test data is collected. At block 54 the constants for the exhaust polynomial function are determined. At block 56 the sensor information is received. At block 58 the actual left, right and average exhaust temperature values are determined.

At block 60 the modeled left, right and average exhaust temperature values are determined using the exhaust temperature polynomial function and sensor information. Then, the left, right and average difference values are determined from a comparison of the modeled values to the actual values, at block 62. At block 64 the exhaust temperature split value is determined. Then, the above determined data can be optionally trapped or collected as shown at block 66, and trended, as shown at block 68.

At block 70 it is determined if the exhaust temperature is normal, and if yes, new sensor information is collected and the process repeated beginning at block 56. If no, the engine is diagnosed, as shown at block 72.

Figure 4:
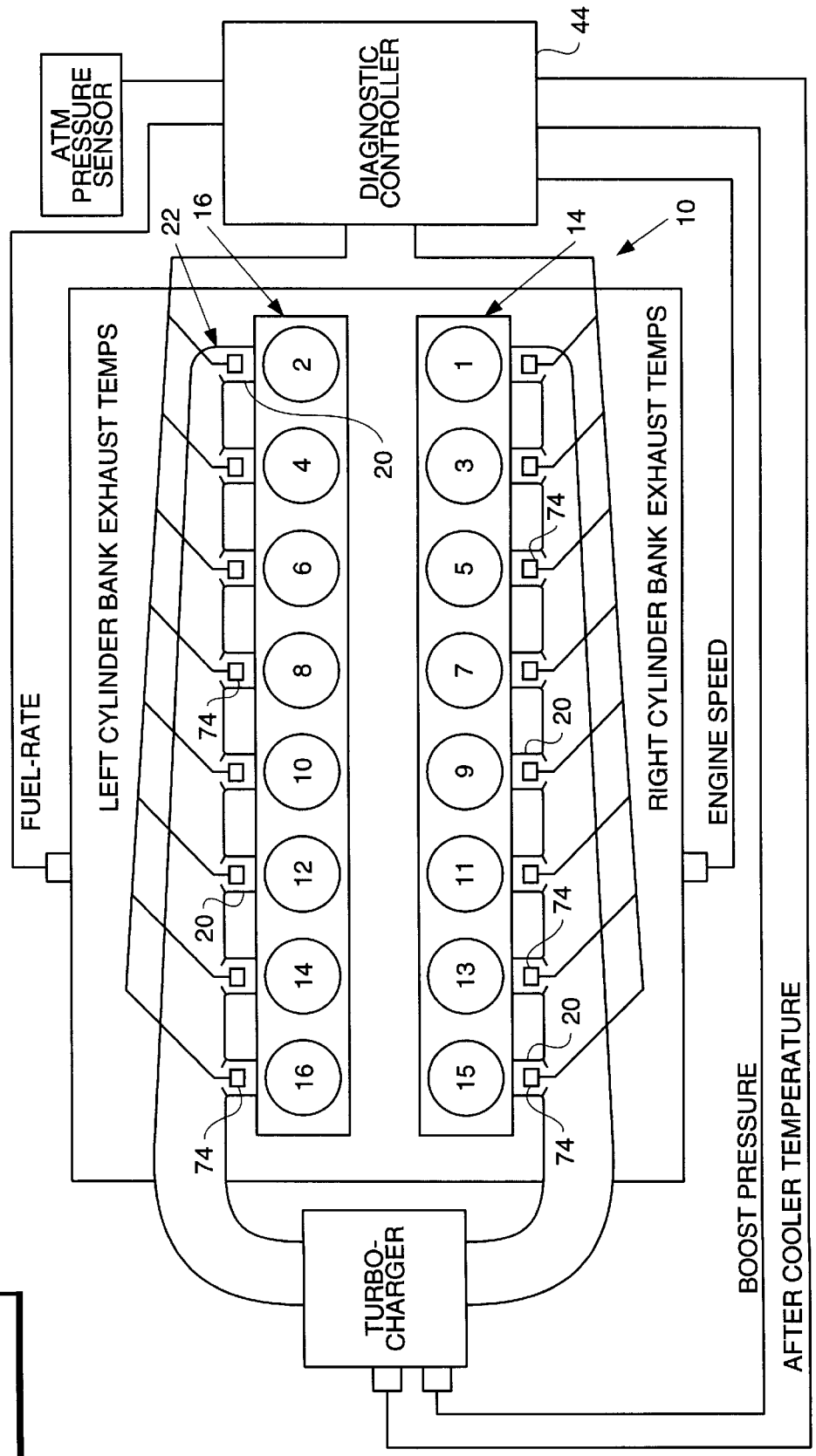
FIG. 4 is a schematic representation of the engine of FIG. 1 showing alternative apparatus according to the invention.

Referring to FIG. 4, an alternative exhaust temperature sensor arrangement for engine 10 for use with the apparatus and method according to the invention is shown. Here, a plurality of exhaust temperature sensors 74 are provided, one sensor in each exhaust runner 20 of the respective exhaust manifolds 18 and 22. Sensor information from sensors 74 of right exhaust manifold 18 is received by diagnostic controller 44, summarized, and divided by the number of cylinders associated with that manifold, e.g., 8, to determine the cylinder port temperature for the right cylinder bank 14, the temperature for the left cylinder bank 16 being determined in the same manner. Thereafter, the actual average exhaust temperature value can be determined, as well as the modeled left, right and average exhaust temperature values as explained above, and the engine diagnosed. Alternatively, difference values ($D_i$) may be computed for each individual cylinder, and degradation of an individual fuel injector is determined whenever a high or low limit for the associated fuel injector is exceeded.

Industrial Applicability

The exhaust temperature model according to the present invention has utility for diagnosis of a wide variety of problems associated with internal combustion engines, including, but not limited to, fuel injector degradation and other fuel delivery problems. Accordingly to the invention, diagnosis of such problems can be narrowed to an indicated cylinder bank, and in some instances, an individual cylinder when temperature sensors 74 for the respective cylinders are employed.

Other aspects, objects, and advantages of this invention can be obtained from a study of the drawings, the disclosure, and the appended claims.

What is claimed is:

1. A method for diagnosing an engine, the engine including a first cylinder bank and a second cylinder bank, the method comprising the steps of:

(a) determining an actual exhaust temperature value for the first cylinder bank, an actual exhaust temperature value for the second cylinder bank, and an average exhaust temperature value for the first and second cylinder banks;

(b) determining a plurality of parameters;

(c) determining a modeled exhaust temperature value for the first cylinder bank, a modeled exhaust temperature value for the second cylinder bank, and a modeled average exhaust temperature value for the first and second cylinder banks, as a function of the plurality of parameters;

(d) comparing the modeled and actual exhaust temperature values for the first cylinder bank, comparing the modeled and actual exhaust temperature values for the second cylinder bank, and the modeled and actual average temperature values, and responsively determining a difference value for the first cylinder bank, a difference value for the second cylinder bank, and an average difference value, respectively; and (e) diagnosing the engine as a function of at least one of the difference value for the first cylinder bank, the difference value for the second cylinder bank, and the average difference value.

2. The method, as set forth in claim 1, wherein the parameters determined in step (b) comprise an engine speed parameter, a fuel-rate parameter, and an air/fuel ratio parameter.

3. The method, as set forth in claim 2, wherein the air/fuel ratio parameter is a function of boost pressure, engine speed, and fuel-rate.

4. The method, as set forth in claim 1, wherein the modeled exhaust temperatures are derived using a polynomial function.

5. The method, as set forth in claim 1, where in step (e) the engine is diagnosed as having a fault condition when the difference value for any of the first cylinder bank, the second cylinder bank and the average of the cylinder banks exceeds at least one of a predetermined high limit and a predetermined low limit.

6. The method, as set forth in claim 1, comprising the further step of diagnosing the engine as a function of a difference between the actual exhaust temperature values for the first and second cylinder banks.

7. Apparatus for diagnosing an engine, the engine including a first cylinder bank and a second cylinder bank, the apparatus comprising:

(a) means for determining an actual exhaust temperature value for the first cylinder bank, an actual exhaust temperature value for the second cylinder bank, and an average exhaust temperature value for the first and second cylinder banks;

(b) means for determining a plurality of parameters;

(c) means for determining a modeled exhaust temperature value for the first cylinder bank, a modeled exhaust temperature value for the second cylinder bank, and a modeled average exhaust temperature value for the first and second cylinder banks, as a function of the plurality of parameters;

(d) means for comparing the modeled and actual exhaust temperature values for the first cylinder bank, comparing the modeled and actual exhaust temperature values for the second cylinder bank, and the modeled and actual average temperature values, and responsively determining a difference value for the first cylinder bank, a difference value for the second cylinder bank, and an average difference value, respectively; and (e) means for diagnosing the engine as a function of at least one of the difference value for the first cylinder bank, the difference value for the second cylinder bank, and the average difference value.

8. Apparatus, as set forth in claim 7, wherein the means for determining the actual exhaust temperature values for the first and second cylinder banks comprise a temperature sensor associated with each respective cylinder bank.

9. Apparatus, as set forth in claim 7, wherein the means for determining an actual temperature value for the respective first cylinder bank and second cylinder bank comprise temperature sensors associated with each cylinder of the respective cylinder banks.

10. Apparatus, as set forth in claim 7, wherein the means for determining a plurality of parameters comprise means for determining an engine speed parameter, means for determining a fuel-rate parameter and means for determining an air/fuel ratio parameter.

* * * * *